United States Patent [19]

Chetty et al.

[11] Patent Number: 4,480,297
[45] Date of Patent: Oct. 30, 1984

[54] SYNCHRONIZING CIRCUIT FOR PUSH-PULL INVERTER

[75] Inventors: P. R. K. Chetty; Donald G. Fair, both of Rockford, Ill.

[73] Assignee: Sundstrand Corporation, Rockford, Ill.

[21] Appl. No.: 480,688

[22] Filed: Mar. 31, 1983

[51] Int. Cl.³ .......................................... H02M 3/335
[52] U.S. Cl. ..................................... 363/26; 363/56; 363/134
[58] Field of Search ................... 363/24–26, 363/41, 56, 97–98, 133–134

[56] References Cited

U.S. PATENT DOCUMENTS

| | | | |
|---|---|---|---|
| 3,869,566 | 3/1975 | Smith | 363/26 X |
| 3,916,283 | 10/1975 | Burrows | 363/26 |
| 4,208,706 | 6/1980 | Suzuki et al. | 363/26 |
| 4,233,658 | 11/1980 | Lupatin et al. | 363/134 X |
| 4,404,623 | 9/1983 | Jourdan | 363/56 |

Primary Examiner—Peter S. Wong
Attorney, Agent, or Firm—Wood, Dalton, Phillips, Mason & Rowe

[57] ABSTRACT

A direct current to alternating current inverter with an output transformer is regulated by a pulse width modulator which alternately closes one of two switches connected with the center tapped primary winding of the output transformer. A synchronizing circuit for the pulse width modulator has means for gating synchronizing pulses to the clock of the modulator, blocking synchronizing signals which would cause an unbalance in the duty cycles of the switches and saturation of the output transformer.

9 Claims, 2 Drawing Figures

SYNCHRONIZING CIRCUIT FOR PUSH-PULL INVERTER

DESCRIPTION

Technical Field

This invention relates to the pulse width modulator of a regulated, push-pull DC to AC inverter.

BACKGROUND OF THE INVENTION

A DC to AC inverter has a DC source and an output transformer with a center tapped primary winding. Two switches connect the DC source alternately with each half of the primary winding generating an alternating signal in the transformer secondary. A pulse width modulator is responsive to the inverter output to control the relative time of conduction of each of the switches. The modulator includes a clock which generates a ramp signal that is compared with an output error siganl, generating switching pulses that are directed alternately to the two switches.

In some situations it is desirable that the inverter clock be synchronized with an external signal source so that beat frequencies are not set up in the circuits of other electronic equipment located in proximity to the inverter.

If synchronization occurs near the start of a ramp signal, there will be two nearly successive actuations of the same switch within a period of the clock. This results in an unbalance in the flux conditions of the output transformer and the transformer may saturate causing a current overload and failure of one of the switches.

SUMMARY OF THE INVENTION

This invention is concerned with a synchronizing circuit for the pulse width modulator of an inverter which overcomes the problems outlined above.

One feature of the invention is the provision of a gating circuit having an input connected from the clock of the pulse width modulator, the gating circuit blocking synchronizing signals which would cause an unbalance in the duty cycle of the inverter switches and saturation of the output transformer.

More particularly, it is a feature of the invention that the synchronizing circuit includes a delay circuit whose input is connected to a pulse from the pulse width modulator clock, synchronized with the ramp. An AND circuit has the delayed pulse output connected with one input and the synchronizing signals with another input. Synchronizing signals which do not coincide with the delayed clock pulse are blocked. Only those synchronizing signals which occur during the delayed clock pulse are passed to the clock to synchronize its operation.

Further features and advantages of the invention will appear from the following specification and from the drawings.

The invention is illustrated and will be described as embodied in a DC to DC converter in which an unregulated DC input is converted to a regulated DC output that may be the same or a different voltage than the input. The synchronizing circuit may be used with an inverter where the output is alternating rather than direct. Accordingly, reference will sometimes be made in the specification and in the claims to an inverter rather than a converter.

It should also be apparent to one skilled in the art that transformers used in inverters, converters, forward converters and fly-back converters all share the need to operate within the limits of flux saturation. Given an "on" period of a first switch to drive the flux level in one direction, all the above circuits depend on the flux to be driven in the reverse direction. This can be accomplished for a push-pull inverter by an equal "on" period of a second transistor connected to the primary winding, or for the forward and fly-back converters by an uninterrupted period of time for the energy to decay to a low value. All of the above circuits are subject to flux saturation failures if the first switch is operated again within one complete alternating cycle of the transformer, which could happen if a sync pulse occurs before the flux is driven to the original value it had prior to first switch's "on" period. Thus, this synchronizing circuit can be used in any pulse width modulated DC—DC converter or DC—AC inverter where the output is coupled using a transformer.

Figure 1:
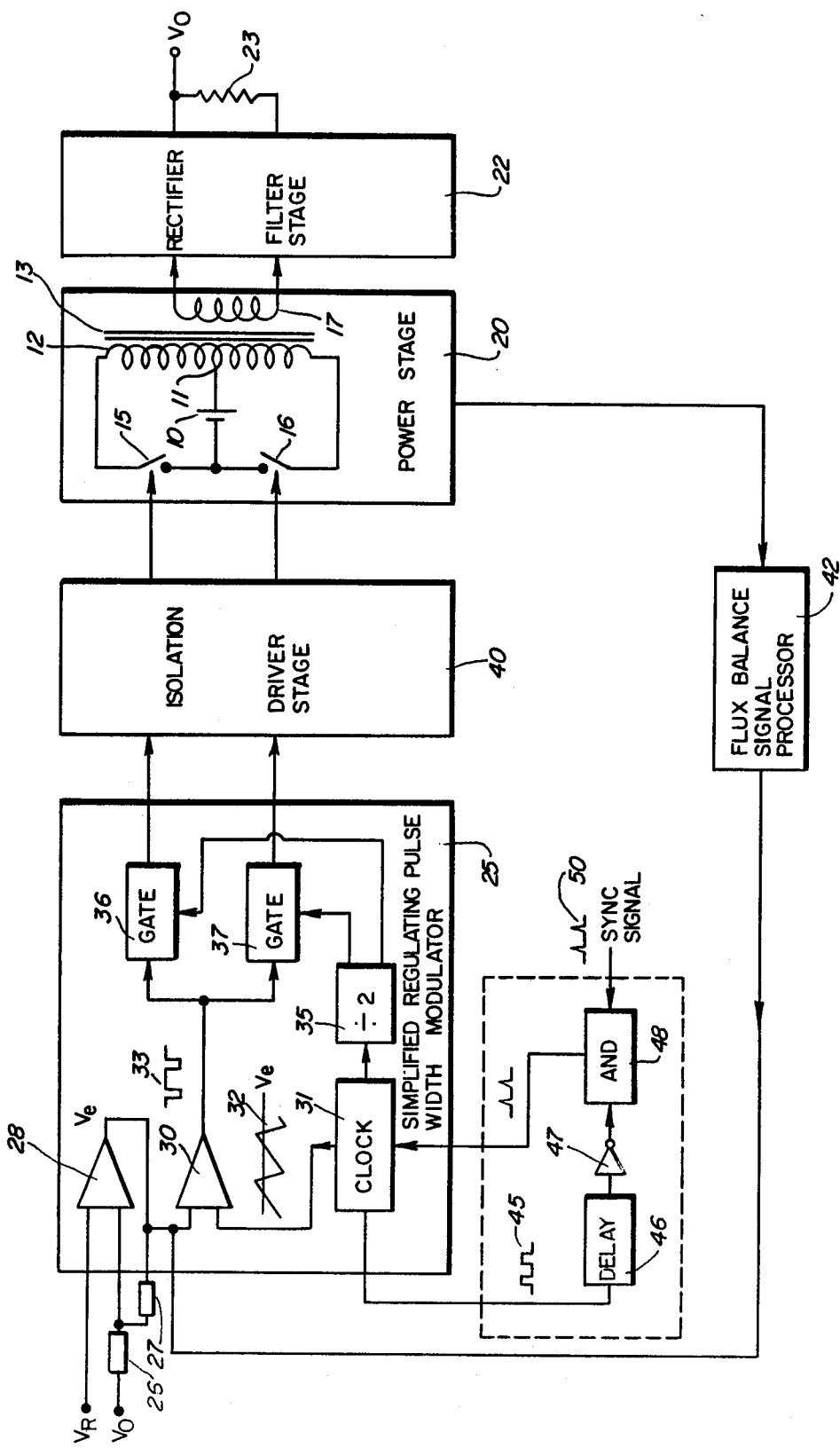
FIG. 1 is a block diagram of a converter with a synchronizing signal circuit embodying the invention.

Turning now to FIG. 1, a DC source 10 has one terminal connected with the center tap 11 of the primary winding 12 of a power transformer 13. The other terminal of the DC source 10 is connectable through power switches 15, 16 with one or the other of the two halves of primary winding 12. The two power switches are actuated to close condition alternately, generating an alternating output in the secondary winding 17 of transformer 13. The DC source 10, power switches 15, 16 and output transformer 13 are identified collectively as the power stage 20 of the converter.

Power switches 15, 16 are illustrated schematically as single pole, single throw mechanical switches. In practice they are power semiconductor devices actuated to a closed or conductive condition by suitable control signals.

The alternating output from transformer secondary winding 17 is connected with a rectifier and filter stage 22 which has a DC output $V_o$ developed across a load resistor 23.

A regulating pulse width modulator which develops control signals for power switches 15 and 16 is illustrated in simplified block form at 25. The output voltage $V_o$ is connected through an input impedance network 26, and a feedback impedance network 27, to one input of an error circuit 28. The other input of amplifier 28 is connected with a reference potential $V_R$. The output of amplifier 28 is a voltage error signal $V_e$ connected with the input of a switch pulse generator comparator 30.

A free running clock circuit 31 generates a ramp signal 32 connected with the other input of comparator 30. When the voltage error signal $V_e$ exceeds ramp signal 32, pulses 33 occur which are used to control power switches 15, 16. Signals from clock 31 synchronized with ramp signal 32 are connected with a divide-by-2 divider circuit 35 developing signals at half the clock frequency to operate gates 36, 37 and direct the switch control signals alternately to the switches 15, 16.

An isolation and driver stage 40 includes circuits, as opto-isolators, which isolate the pulse width modulator from power stage 20. Driver circuits develop signals correlated in time with switch control signals 33 and of the same time duration, and appropriate power level and form to actuate the power switches 15, 16. The specific character of these circuits forms no part of the invention and the details of the circuits are not shown.

Current imbalance between power switches 15, 16 due, for example, to mismatches in the characteristics of the power switches and the two halves of primary winding 12 may result in an imbalance which causes unsymmetric operation of the inverter circuit. If the unsymmetric condition is not corrected, the transformer core may saturate resulting in current overload and failure of power switches 15, 16.

A flux balance signal processor 42 is connected between the power stage 20 and the voltage error input of comparator 30. If the currents through power switches 15, 16 are out of balance, the flux balance signal processor 42 adds a corrective signal to the voltage error $V_e$ to cause the currents to remain balanced. Further details of the flux balance signal processor may be found in Chetty et al application Ser. No. 549,980 filed Nov. 8, 1983. The flux balance signal processor 42 cannot, however, correct a current unbalance much in excess of 25 percent of the period of clock 31.

Where it is desirable to synchronize the free-running clock 31 with an external synchronizing signal an imbalance of much greater than 25 percent may occur. The present invention is concerned with a circuit for controlling the clock synchronization to prevent such an imbalance.

The DC to DC converter operates satisfactorily with a free-running clock 31. However, if the converter is used in physical proximity to equipment subject to electromagnetic interference, it is desirable to control the clock frequency to avoid the establishment of beat frequencies in the circuits of the other equipment. This is typically done by providing a synchronizing signal from a stable source.

When the synchronizing signal is first applied to the clock 31 of the pulse width modulator, the synchronizing signal may occur at any time relation with respect to ramp 32. If the synchronizing signal occurs shortly after the start of the ramp, it causes the ramp to restart resulting in directing a narrow width pulse to one switch 15 while the preceding and following pulses are of normal steadystate width to switch 16. This establishes a flux unbalance condition in the output transformer 13 which cannot be compensated by flux balance signal processor 42. As a result, the transformer saturates and the conducting power switch fails from a current overload.

In accordance with the invention, the synchronizing signal is gated to prevent this occurrence.

Clock 31 generates a pulse signal 45, each positive going signal transition being in synchronism with the start of ramp 32. Pulse signal 45 is connected with a delay circuit 46 in which its falling edge is delayed for a time preferably of the order of 75 percent of the period of clock 31. The delayed pulse 45 is connected through inverter 47 with one input of AND circuit 48. The synchronizing signal 50 from a suitable source is connected with the other input of AND circuit 48. If a synchronizing signal occurs at a time other than the occurrence of delayed clock pulse 45, the synchronizing signal is passed to the clock and synchronizes its operation. If, however, the synchronizing signal occurs during the delayed pulse 45, the synchronizing signal is blocked so that clock 31 is not reset and the ramp 32 is not restarted in a circumstance which would cause saturation of output transformer 13 and failure of the power switches.

Figure 2:
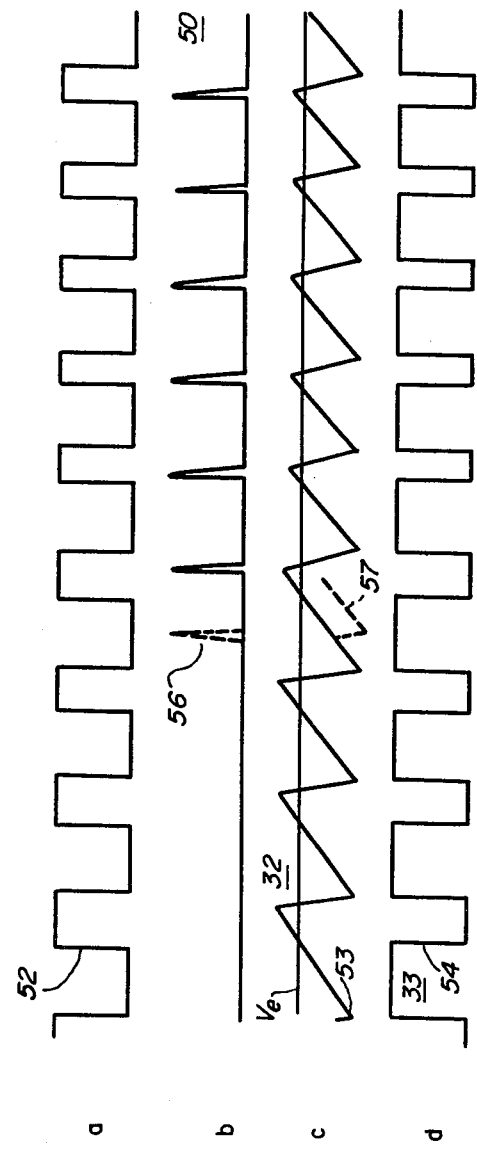
FIG. 2 is a set of signal waveforms useful in describing operation of the pulse width modulator and the synchronizing signal circuit.

Some of the time relationships involved are illustrated by the signal waveforms of FIG. 2. The signal wavefrom of FIG. 2(a) represents the delayed clock pulses at the output of delay circuit 46 after inversion. FIG. 2(b) shows the synchronizing pulses 50 and FIG. 2(c) the ramp 32 from the block 31. The left portion of FIG. 2 illustrates conditions before the synchronizing signals 50 are applied to the inverter. The positive going signal transition 52 of the delayed and inverted clock pulse signal follows the start 53 of ramp signal 32, FIG. 2(c) by a time greater than half the period of the clock and preferably of the order of 75 percent of the clock period. The switch control signal 33 is shown at FIG. 2(d). The trailing edge 54 of a switch control signal occurs when the ramp signal 32 exceeds the error signal $V_e$, FIG. 2(c).

If a synchronizing signal should occur during the initial portion of a ramp, as indicated in broken lines at 56 and the sync signals were applied to the clock 31, the ramp would restart as indicated in broken lines 57. The power switch current pulse width ratio may exceed that which can be compensated by the flux balance signal processor 42 resulting in saturation and circuit failure. In accordance with the invention, however, the synchronizing pulses 50 are gated by the delayed clock signal of FIG. 2(c). The transition of the ramp signals 32 from unsynchronized to synchronized operation of the clock occurs smoothly. The cycle-to-cycle variations in current pulse width does not exceed that which can be compensated by the flux balance signal processor 42 and a saturation condition does not occur in the output transformer 13.

Alternatively, the gating signal to AND circuit 48 can be developed from the output 33 of comparator 30 or from the drive signals to switches 15, 16.

We claim:

1. In a push-pull inverter having a DC source, an output transformer with a center tapped primary winding and a secondary winding, a pair of switches, each connected between said DC source and one-half of said primary winding and a pulse width modulator for developing switch control signals alternately closing said switches to generate an alternating output in said secondary winding, the pulse width modulator including a clock generating a ramp signal, an error circuit comparing the output of said transformer with a reference to generate an error signal and a switch pulse generator responsive to said ramp and error signals to develop said switch control signals, a circuit for synchronizing said pulse width modulator, comprising:

a source of synchronizing signals; and a gating circuit having an input connected to said source of synchronizing signals and an output connected with said clock to synchronize the clock, said gating circuit blocking synchronizing signals which would cause an unbalance in the duty cycle of said switches and saturation of the output transformer.

2. The synchronizing circuit of claim 1 in which the gating circuit blocks synchronizing signals which cause more than one closing of one of said pair of switches in less than one period of said clock.

3. The synchronizing circuit of claim 1 in which said gating circuit passes synchronizing signals during the last one-quarter of the period of said clock.

4. The synchronizing circuit of claim 1 for an inverter in which said clock generates a pulse signal in synchronism with the start of said ramp, the gating circuit including a delay circuit having an input to which the pulse signal from said clock is connected; and
- an AND circuit having said synchronizing signal connected with one input and the delayed pulse signal connected with the other input, the output of said AND circuit being connected with said clock to synchronize operation thereof with the synchronizing signals passed by said gating circuit.

5. The synchronizing circuit of claim 4 in which the delay of said delay circuit is of the order of 75 percent of the period of said clock.

6. A synchronizing circuit for the pulse width modulator of a regulated, push-pull inverter, said pulse width modulator including a clock generating a ramp signal, the synchronizing circuit comprising:
- a source of synchronizing signal; and
- a gating circuit having an input connected with said source of synchronizing signals and an output connected with said clock to synchronize the clock, said gating circuit blocking synchronizing signals which would cause an unbalance in the duty cycle of said push-pull inverter.

7. The synchronizing circuit of claim 6 in which said gating circuit blocks synchronizing signals which occur within three-quarters the period of said clock following the start of a ramp signal.

8. In a push-pull inverter having a DC source, an output transformer with a center tapped primary winding and a secondary winding, a pair of switches, each connected between said DC source and one-half of said primary winding, a pulse width modulator for developing switch control signals alternately closing said switches to generate an alternating output in said secondary winding, the pulse width modulator including a clock generating a ramp signal, an error circuit comparing the output of said transformer with a reference to generate an error signal and a switch pulse generator responsive to said ramp and error signals to develop said switch control signals, and a transformer flux balance circuit responsive to an unbalance in the currents through the switches to modify said error signal,
- a circuit for synchronizing said pulse width modulator, comprising:
- a source of synchronizing signals; and
- a gating circuit having an input connected to said source of synchronizing signals and an output connected with said clock to synchronize the clock, said gating circuit blocking synchronizing signals which would cause an unbalance in the duty cycle of said switches and saturation of the output transformer.

9. In an inverter having a DC source, an output transformer with a primary winding and a secondary winding, a switch connected between said DC source and said primary winding and a pulse width modulator for developing a switch control signal alternately closing and opening said switch to generate an alternating output in said secondary winding, the pulse width modulator including a clock generating a ramp signal, an error circuit comparing the output of said transformer with a reference to generate an error signal and a switch pulse generator responsive to said ramp and error signals to develop said switch control signal,
- a circuit for synchronizing said pulse width modulator, comprising:
- a source of synchronizing signals; and
- a gating circuit having an input connected to said source of synchronizing signals and an output connected with said clock to synchronize the clock, said gating circuit blocking synchronizing signals which would cause more than one closing of said switch in less than one period of said clock and saturation of the output transformer.

* * * * *